No. 856,053. PATENTED JUNE 4, 1907.
W. GROTHE.
SHOCK REDUCER FOR AUTOMOBILES.
APPLICATION FILED NOV. 22, 1905.
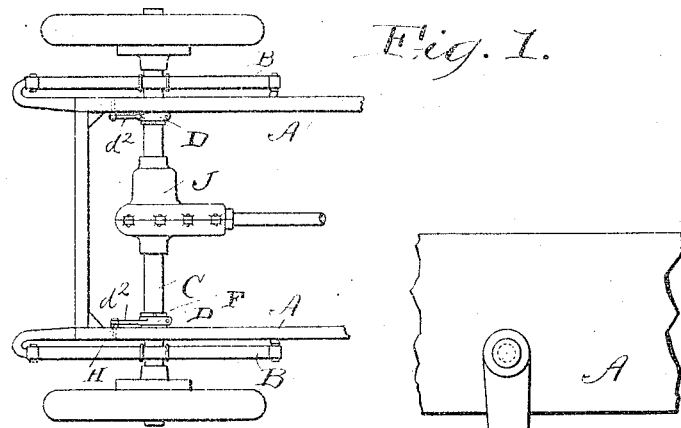
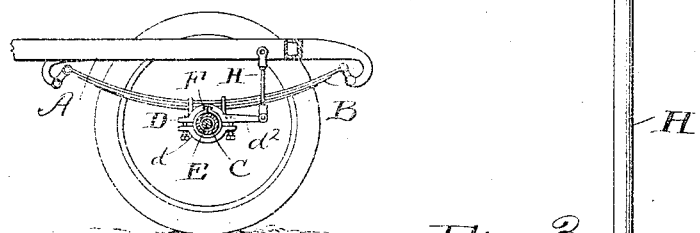
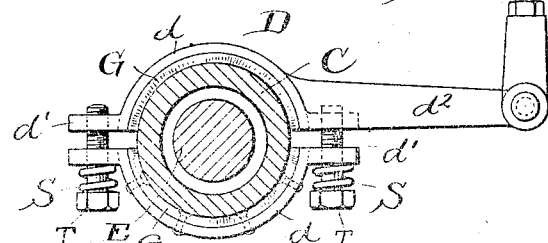
Witnesses
E. B. Hilchist
H. B. Sullivan
Inventor
Walter Grothe
by his attorneys
Thurston Bates Woodward

UNITED STATES PATENT OFFICE.

WALTER GROTHE, OF CLEVELAND, OHIO, ASSIGNOR TO THE WHITE SEWING MACHINE COMPANY, OF CLEVELAND, OHIO, A CORPORATION OF OHIO.

SHOCK-REDUCER FOR AUTOMOBILES.

No. 856,053.   Specification of Letters Patent.   Patented June 4, 1907.

Application filed November 22, 1905. Serial No. 288,512.

*To all whom it may concern:*

Be it known that I, WALTER GROTHE, a citizen of the United States, residing at Cleveland, in the county of Cuyahoga and State of Ohio, have invented a certain new and useful Improvement in Shock-Reducers for Automobiles, of which the following is a full, clear, and exact description, reference being had to the accompanying drawings.

The object of the invention is to reduce and substantially prevent the sudden and violent movement of an automobile body which usually takes place when the vehicle is rapidly going over a rough road, and to accomplish that result by simple and inexpensive means adapted for easy application to the vehicle.

The invention may be summarized as the combinations of parts shown in the drawing and hereinafter described and definitely pointed out in the claims.

In the drawing Figure 1 is a plan view of the rear part of the frame and running gear of an automobile. Fig. 2 is a side elevation of the part shown in Fig. 1. Fig. 3 is a sectional side elevation, on an enlarged scale, of the mechanism constituting the present invention, together with those parts of the automobile to which it is to be attached. Fig. 4 is a plan view of the mechanism shown in Fig. 3, omitting the part of the automobile frame and the link connected thereto.

Referring to the parts by letters A A represent the two side members of the automobile frame upon which the passenger carrying body is to be secured. This frame is suspended on springs B, which are in turn secured by clips to the dead axles. The dead axles at the rear of the vehicle are cylindrical tubes C, which extend laterally from the casing J of the compensating gearing, and through which rotating live axles E pass. The dead axle at the front of an automobile is a transverse tubular member, to the ends of which are pivoted the knuckles which include the axle on which the front wheels rotate. Embracing each of these cylindrical dead axles C is a spring clamp D composed of two semi-cylindrical pieces $d$ having projecting ears $d'$ $d'$. Screws T pass loosely through the ears of one piece and screw into the ears of the other piece; and a spring S surrounds the shank of this screw and is compressed between its head and the ear through which the screw loosely passes. This spring clamp has an inside facing G of leather or other suitable material which bears upon the tube C. By turning up the screw T, the pressure of this clamp upon the dead axle may be regulated. The upper clamp member, which is the member into which said screws screw, is provided with an arm $d^2$. A link H is pivotally connected with this arm and with the automobile frame member A. It will be understood that preferably four of these devices are to be employed on each automobile, two associated with the rear axle and two with the front axle. Endwise movements of these clamps upon the dead axles should be prevented, and this result may be attained by collars F clamped upon the axles in substantial contact with both sides of each spring clamp.

Ordinarily when an automobile is moving rapidly over a rough road, the resulting movements of the body up and down are rapid and follow each other in quick succession. But, when an automobile is equipped with the above described shock reducing mechanism, sudden relative movements of the axles and body are checked by the friction between the spring clamps and the dead axles, and, thereby, the extent and violence of such movements are greatly reduced. On the other hand, this shock reducing mechanism has no material effect in lessening the desired movement of the body, due to the flexing of the springs under normal conditions, that is to say, when the tendency to movement does not frequently occur, because a slow movement of the clamps upon the axles, corresponding with a slow movement of the body, takes place easily.

Having described my invention, I claim:

The combination, with frame and the dead axle of an automobile, of two substantially semi-cylindrical clamping members having laterally projecting ears, screws passing loosely through the ears of one of said members and screwing into the ears of the other member, springs compressed between the heads of said screws and the ears of the first named clamp member, an arm rigid with the last named clamp member, and a link pivotally connected with said arm and with the automobile frame.

In testimony whereof, I hereunto affix my signature in the presence of two witnesses.

WALTER GROTHE.

Witnesses:
E. B. GILCHRIST,
H. B. SULLIVAN.